US010483761B2

United States Patent
Baba et al.

(10) Patent No.: US 10,483,761 B2
(45) Date of Patent: Nov. 19, 2019

(54) POWER MANAGEMENT DEVICE, POWER MANAGEMENT SYSTEM, SERVER, POWER MANAGEMENT METHOD, AND PROGRAM

(71) Applicant: PANASONIC CORPORATION, Osaka (JP)

(72) Inventors: Akira Baba, Osaka (JP); Haruka Nakasone, Osaka (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 14/904,398

(22) PCT Filed: Jul. 4, 2014

(86) PCT No.: PCT/JP2014/003572
§ 371 (c)(1),
(2) Date: Jan. 11, 2016

(87) PCT Pub. No.: WO2015/004893
PCT Pub. Date: Jan. 15, 2015

(65) Prior Publication Data
US 2016/0156188 A1 Jun. 2, 2016

(30) Foreign Application Priority Data
Jul. 12, 2013 (JP) ................................. 2013-146789

(51) Int. Cl.
*H02J 3/32* (2006.01)
*H02J 3/38* (2006.01)
(Continued)

(52) U.S. Cl.
CPC ............... *H02J 3/32* (2013.01); *G05B 15/02* (2013.01); *H02J 3/383* (2013.01); *H02J 7/35* (2013.01);
(Continued)

(58) Field of Classification Search
CPC ........................................................ H02J 3/32
See application file for complete search history.

(56) References Cited

U.S. PATENT DOCUMENTS

2002/0041126 A1 4/2002 Provanzana et al.
2009/0192655 A1 7/2009 Ichikawa et al.
(Continued)

FOREIGN PATENT DOCUMENTS

JP 2005-102364 A 4/2005
JP 2008-054439 A 3/2008
(Continued)

OTHER PUBLICATIONS

Extended European Search Report issued in corresponding European Patent Application No. 14823221.8, dated Jun. 15, 2016.
(Continued)

*Primary Examiner* — Tejal Gami
(74) *Attorney, Agent, or Firm* — McDermott Will & Emery LLP

(57) ABSTRACT

Power management device includes memory, classification portion, planning portion and indication portion. Classification portion classifies a change in monitoring power during a unit period with respect to each of buildings, stored in memory, into any one of kinds of electric power patterns. Planning portion determines pattern sets based on the kinds of electric power patterns, and determines control content for charging and discharging of electric storage apparatus with respect to each pattern set under condition of minimizing any one of amount of electric power to be received from power grid, compensation of amount of electric power to be received from power grid, and amount of carbon dioxide to be exhausted. Indication portion indicates control content corresponding to each of pattern sets determined by plan-
(Continued)

ning portion to electric storage apparatus of a building, which each pattern set conforms with, of the buildings.

10 Claims, 7 Drawing Sheets

(51) Int. Cl.
  *H02J 7/35* (2006.01)
  *G05B 15/02* (2006.01)
  *H02J 13/00* (2006.01)
(52) U.S. Cl.
  CPC ........... *H02J 13/0079* (2013.01); *Y02B 10/14* (2013.01); *Y02B 90/222* (2013.01); *Y02E 10/563* (2013.01); *Y02E 10/566* (2013.01); *Y02E 40/72* (2013.01); *Y02E 60/722* (2013.01); *Y02E 70/30* (2013.01); *Y04S 10/123* (2013.01); *Y04S 10/14* (2013.01); *Y04S 20/12* (2013.01)

(56) References Cited

U.S. PATENT DOCUMENTS

| | | |
|---|---|---|
| 2012/0020703 A1 | 1/2012 | Matsuzaki |
| 2012/0072040 A1 | 3/2012 | Kaji |
| 2012/0083930 A1* | 4/2012 | Ilic .................... G06Q 30/06 700/287 |
| 2013/0024035 A1 | 1/2013 | Ito et al. |
| 2013/0113434 A1 | 5/2013 | Haga et al. |
| 2013/0162037 A1 | 6/2013 | Kim et al. |
| 2014/0052310 A1 | 2/2014 | Baba et al. |

FOREIGN PATENT DOCUMENTS

| | | |
|---|---|---|
| JP | 2009-060704 A | 3/2009 |
| JP | 2012-027214 A | 2/2012 |
| JP | 2012-191774 A | 10/2012 |
| JP | 2013-027214 A | 2/2013 |
| JP | 2013-042575 A | 2/2013 |
| WO | 2011/086886 A1 | 7/2011 |
| WO | 2012/165153 A1 | 12/2012 |

OTHER PUBLICATIONS

International Search Report issued in Application No. PCT/JP2014/003572 dated Aug. 19, 2014, with English translation.
Notice of Allowance issued in corresponding EP Patent Application No. 14823221.8, dated Apr. 9, 2018.
Response to EP Communication, dated Sep. 6, 2017, which was filed on Dec. 11, 2017 in corresponding EP Patent Application No. 14823221.8.

* cited by examiner

POWER MANAGEMENT DEVICE, POWER MANAGEMENT SYSTEM, SERVER, POWER MANAGEMENT METHOD, AND PROGRAM

TECHNICAL FIELD

The invention relates generally to power management devices, power management systems, servers, power management methods and programs, and, more particularly, to a power management devices, a power management system, a server, a power management method and a program, which, when a plurality of consumers exist, each of which owns an electric storage apparatus, determine control content for charging and discharging of the electric storage apparatus according to an individual consumer.

BACKGROUND ART

Conventionally, there has been proposed a technique for considering an energy balance of the whole of a community constituted by many consumers, each of which owns a distribution power supply device (power generation apparatus) and an energy storage device (electric storage apparatus) that are connected with an electric power grid, and controlling those devices (e.g., see JP 2005-102364 A (hereinafter, referred to as "Document 1")). Document 1 discloses a technique of dividing the community into a plurality of consumer groups and generating an operation plan for each consumer group, in order to generate an optimum operation plan with a small calculation amount even when the number of distribution power supply devices is increased.

Also there has been proposed a technique for controlling the amount of power to be stored into and to be discharged from a storage means (electric storage apparatus) based on the amount of power generated by a solar power generation means (power generation apparatus) and power consumption (e.g., see JP 2012-27214 A (hereinafter, referred to as "Document 2")). Document 2 discloses that in order to determine an optimum charging/discharging schedule for a storage battery, a prediction period is defined, and a charging/discharging schedule for the storage battery in the prediction period is obtained by formulation in a mixed integer programming problem.

Since the technique disclosed in Document 1 divides the community into the plurality of consumer groups, the calculation amount can be more reduced, compared with a case of performing calculation for the whole of the community. However, in Document 1, the energy balance of an individual consumer is not considered, and it is therefore impossible to optimize the energy balance of an individual consumer with the technique disclosed in Document 1.

On the other hand, with the technique disclosed in Document 2, it is possible to optimize the balance of the electric power for a consumer. However, if the charging/discharging schedule is to be determined on an individual consumer's side, using an embedded apparatus in which a microcontroller is merely provided, the processing capacity insufficiency will occur. For this reason, an expensive computer is needed. On the other hand, it can be considered to provide a computer for determining the charging/discharging schedules for the plurality of consumers. In other words, it can be considered that the computer centralizedly performs the work for generating the charging/discharging schedule for an individual consumer. When adopting this configuration, an expensive computer is not needed on an individual consumer's side. However, when the number of the consumers is increased, the calculation amount for determining the charging/discharging schedules becomes huge, and accordingly a processing load on the computer also becomes high.

DISCLOSURE OF THE INVENTION

It is an object of the invention to provide a power management device, which, even in a case of centralizedly determining control content for charging and discharging of electric storage apparatuses of a plurality of consumers, can more reduce the entire calculation amount, compared with a case where the control content is calculated for each consumer individually, and to further provide: a power management system using the power management device; a server including the power management device; a power management method used in the power management device; and a program causing a computer to function as the power management device.

A power management device according to an aspect of the invention includes is configured to indicate control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid. The power management device includes a memory, a classification portion, a planning portion and an indication portion. The memory is configured to store a change in monitoring power with time with respect to each of the buildings, and the monitoring power is electric power to be noted in each of the buildings. The classification portion is configured to classify a change in the monitoring power during a prescribed unit period with respect to each of the buildings, stored in the memory, into any one of kinds of electric power patterns. The planning portion is configured to determine two or more pattern sets based on the kinds of electric power patterns, and determine the control content for charging and discharging of the electric storage apparatus with respect to each pattern set under a condition of minimizing any one of an amount of electric power to be received from the power grid, a compensation of the amount of electric power to be received from the power grid, and an amount of carbon dioxide to be exhausted. The indication portion is configured to indicate the control content corresponding to each of the two or more pattern sets determined by the planning portion to the electric storage apparatus of a building, which each pattern set conforms with, of the buildings.

A power management system according to an aspect of the invention includes the above-mentioned power management device, the electric storage apparatus and a control device. The electric storage apparatus is installed in each of the buildings of the consumers which receive electric power from the power grid, and the electric storage apparatus is configured to supply power together with electric power received from the power grid into the electric load through the electric wiring installed in each of the buildings. The control device is configured to control charging and discharging of the electric storage apparatus according to the control content indicated by the power management device.

A server according to an aspect of the invention includes the above-mentioned power management device and a communication interface. The communication interface is configured to communicate with a control device configured to control charging and discharging of the electric storage apparatus installed in each of the buildings according to the control content indicated by the power management device.

A power management method according to an aspect of the invention is to indicate control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid. The power management method includes: storing, with a memory, a change in monitoring power with time with respect to each of the buildings, the monitoring power being electric power to be noted in each of the buildings; classifying, with a classification portion, a change in the monitoring power during a prescribed unit period with respect to each of the buildings, stored in the memory, into any one of kinds of electric power patterns; determining, with a planning portion, two or more pattern sets based on the kinds of electric power patterns, and determining the control content for charging and discharging of the electric storage apparatus with respect to each pattern set under a condition of minimizing any one of an amount of electric power to be received from the power grid, a compensation of the amount of electric power to be received from the power grid, and an amount of carbon dioxide to be exhausted; and indicating, with an indication portion, the control content corresponding to each of the two or more pattern sets determined by the planning portion to the electric storage apparatus of a building, which each pattern set conforms with, of the buildings.

A program according to an aspect of the invention is to cause a computer to function as the above-mentioned power management device. Also, this aspect of the invention is not limited to the program, and may be a computer-readable storage medium that stored the program.

According to the invention, the change in the monitoring power during the prescribed unit period with respect to each of the buildings of the consumers is classified into any one of the two or more pattern sets, and the control content for charging and discharging of the electric storage apparatus, corresponding to each of the two or more pattern sets, is determined. The changes in the monitoring powers in many buildings are aggregated into a few pattern sets. Therefore, when determining the control content for charging and discharging of the electric storage apparatus in an individual building, it is required to determine only the control content for charging and discharging of the electric storage apparatus corresponding to each of the few pattern sets. Accordingly, it is possible to more reduce the calculation amount, compared with a case where the control content is calculated for each of the buildings of the consumers individually. In other words, even in a case of centralizedly determining with a computer the control content for charging and discharging of the electric storage apparatus in each of the buildings of the consumers, a processing load on the computer can be reduced.

BRIEF DESCRIPTION OF THE DRAWINGS

Preferred embodiments of the invention will now be described in further details. Other features and advantages of the invention will become better understood with regard to the following detailed description and accompanying drawings where.

DESCRIPTION OF EMBODIMENTS

Figure 1:
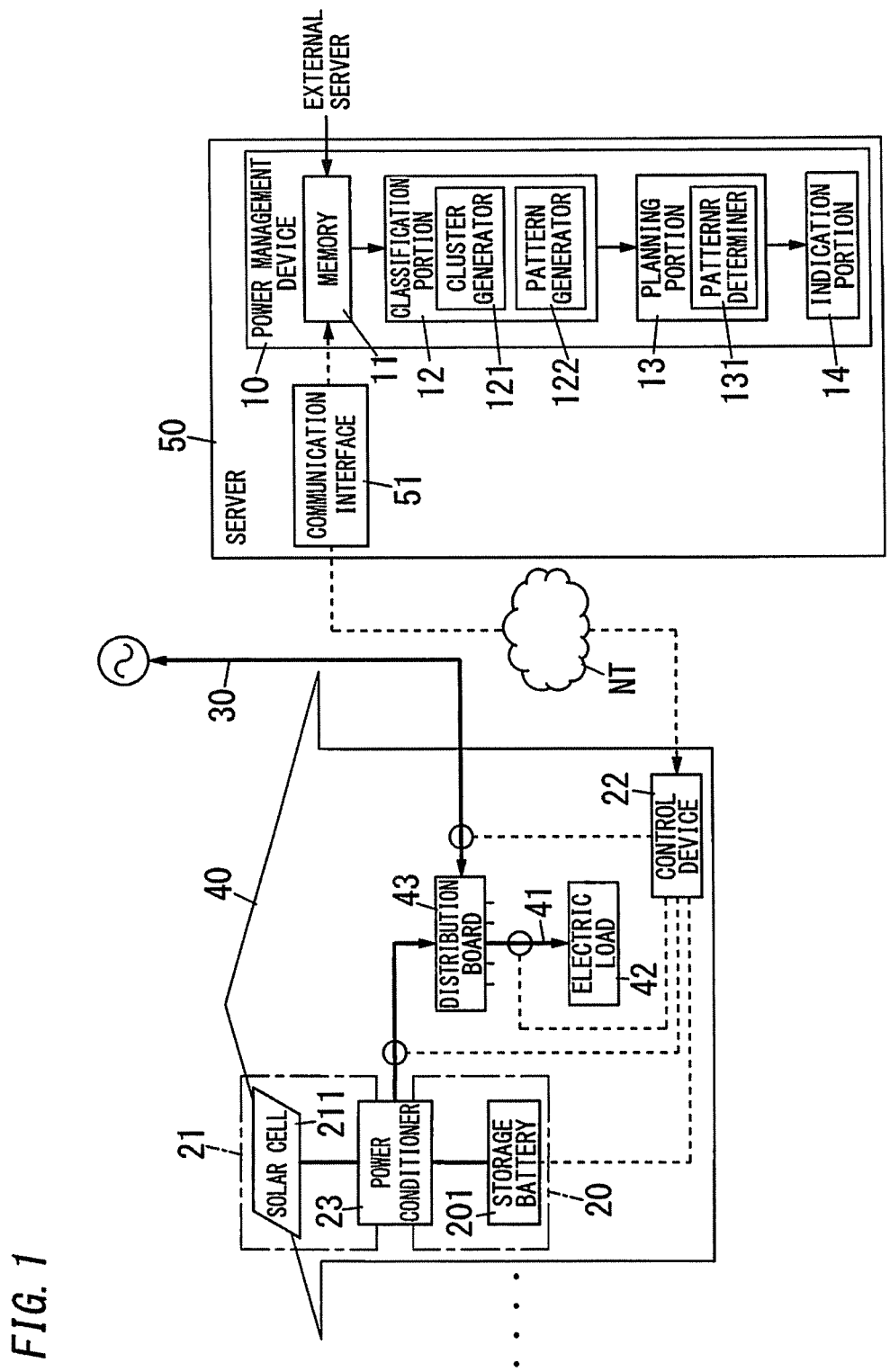
FIG. 1 is a block diagram illustrating an embodiment.

As shown in FIG. 1, electric power stored in an electric storage apparatus 20 (installed in each of buildings 40 of consumers which receive electric power from a power grid 30) and electric power received from the power grid 30 are supplied into an electric load 42 through an electric wiring 41 installed in each of the buildings 40. A power management device 10 is configured to indicate control content for charging and discharging of the electric storage apparatus 20 to each of the buildings 40 individually.

The power management device 10 includes a memory 11, a classification portion 12, a planning portion 13 and an indication portion 14. The memory 11 is configured to store a change in monitoring power with time with respect to each of the buildings 40. The monitoring power mentioned here is electric power to be noted in each of the buildings 40. The classification portion 12 is configured to classify a change in the monitoring power during a prescribed unit period with respect to each of the buildings 40, stored in the memory 11, into any one of kinds of electric power patterns. The planning portion 13 is configured to determine two or more pattern sets based on the kinds of electric power patterns, and determine the control content for charging and discharging of the electric storage apparatus 20 with respect to each pattern set. The control content is determined under a condition of minimizing any one of an amount of electric power to be received from the power grid 30, a compensation of the amount of electric power to be received from the power grid 30, and an amount of carbon dioxide to be exhausted. The indication portion 14 is configured to indicate the control content corresponding to each of the two or more pattern sets determined by the planning portion 13 to the electric storage apparatus 20 of a building 40, which each pattern set conforms with, of the buildings 40.

It is preferred that the monitoring power include: demand power that is electric power consumed by the electric load 42 in each building 40; and a residual capacity of the electric storage apparatus 20 in each building 40. In this case, the memory 11 is configured to store a change in the demand power with time and a change in the residual capacity with time, with respect to each building 40. Also it is preferred that the kinds of electric power patterns include: two or more kinds of demand power patterns, any one of which the change in the demand power during the prescribed unit period is classified into; and two or more kinds of residual capacity patterns, any one of which the residual capacity at a starting point of the prescribed unit period is classified into. In this case, the classification portion 12 is configured to classify each of demand powers respectively corresponding to the buildings 40, stored in the memory 11, into any one of the two or more kinds of demand power patterns, and classify each of residual capacities respectively corresponding to the buildings 40, stored in the memory 11, into any one of the two or more kinds of residual capacity patterns. In this configuration, it is preferred that each of the two or more pattern sets include a combination of any one of the two or more kinds of demand power patterns and any one of the two or more kinds of residual capacity patterns.

When a power generation apparatus 21 that generates power with natural energy and supplies the power generated to the electric load 42 through the electric wiring 41 is installed in each of the buildings 40, it is preferred that the monitoring power further include generation power that is electric power generated by the power generation apparatus 21 in each building 40. In this case, the memory 11 is configured to store a change in the generation power with time with respect to each building 40. Also it is preferred that the kinds of electric power patterns further include two or more kinds of generation power patterns, any one of which the change in the generation power during the prescribed unit period is classified into. In this case, the classification portion 12 is configured to classify each of generation powers respectively corresponding to the buildings 40, stored in the memory 11, into any one of the two or more kinds of generation power patterns. In this configuration, it is preferred that each of the two or more pattern sets include a combination of any one of the two or more kinds of demand power patterns, any one of the two or more kinds of residual capacity patterns, and any one of the two or more kinds of generation power patterns.

It is preferred that the classification portion 12 be configured to classify the generation powers into the two or more kinds of generation power patterns, based on a region where the power generation apparatus 21 is located, in addition to the change in the generation power. Also it is preferred that the classification portion 12 is configured to classify the generation powers into the two or more kinds of generation power patterns, based on rated power of the power generation apparatus 21, in addition to the change in the generation power.

Incidentally, it is preferred that the classification portion 12 include a cluster generator 121 and a pattern generator 122. The cluster generator 121 is configured to classify changes in monitoring powers respectively corresponding to the buildings 40 during the prescribed unit period into two or more clusters. The pattern generator 122 is configured to determine, as an electric power pattern, a representative pattern for changes in one or more monitoring powers with respect to each of the two or more clusters obtained by the cluster generator 121. In this case, it is preferred that the planning portion 13 include a pattern determiner 131 that is configured to compare: two or more representative patterns respectively corresponding to the two or more clusters, determined by the pattern generator 122; and a change in monitoring power with respect to a building 40 to be noted, stored in the memory 11, and set a representative pattern having the highest similarity, among the two or more representative patterns, to an electric power pattern for the building 40 to be noted. Also it is preferred that the cluster generator 121 previously store the number of the two or more clusters for classifying the changes in the monitoring powers.

It is preferred that the monitoring power stored in the memory 11 be at least one of: a result value during a past unit period; and a prediction value during a future unit period.

Here a power management system includes the power management device 10, the electric storage apparatus 20 and a control device 22. The electric storage apparatus 20 is installed in each of the buildings 40 of the consumers which receive electric power from the power grid 30, and is configured to supply power together with electric power received from the power grid 30 into the electric load 42 through the electric wiring 41 installed in each of the buildings 40. The control device 22 is configured to control charging and discharging of the electric storage apparatus 20 according to the control content indicated by the power management device 10.

The power management device 10 uses a power management method mentioned below. This power management method is to indicate the control content for charging and discharging of the electric storage apparatus 20 installed in each of the buildings 40 of the consumers to each of the buildings 40 individually, when supplying into the electric load 42 through the electric wiring 41 installed in each of the buildings 40: electric power stored in the electric storage apparatus 20 in each of the buildings 40 which receive electric power from the power grid 30; and electric power received from the power grid 30. The power management method includes storing, with the memory 11, a change in monitoring power with time with respect to each of the buildings 40. The monitoring power mentioned here is electric power to be noted in each of the buildings 40. The power management method further includes classifying, with the classification portion 12, a change in the monitoring power during a prescribed unit period with respect to each of the buildings 40, stored in the memory 11, into any one of kinds of electric power patterns. The management method further includes: determining, with the planning portion 13, two or more pattern sets based on the kinds of electric power patterns; and determining the control content for charging and discharging of the electric storage apparatus 20 with respect to each pattern set under a prescribed condition. The prescribed condition is a condition of minimizing any one of an amount of electric power to be received from the power grid 30, a compensation of the amount of electric power to be received from the power grid 30, and an amount of carbon dioxide to be exhausted. The management method further includes indicating, with the indication portion 14, the control content corresponding to each of the two or more pattern sets determined by the planning portion 13 to the electric storage apparatus 20 of a building 40, which each pattern set conforms with, of the buildings 40.

Hereinafter, an embodiment will be described in detail. In a configuration example shown in FIG. 1, a building 40 of each consumer includes, as the power generation apparatus 21, a solar power generation apparatus, but the power generation apparatus 21 is optional. In other words, the technology described in the following embodiment can be applied also in a building 40 that includes only the electric storage apparatus 20. The power management device 10 described below includes, as a main hardware element, a computer that includes a processor operating according to a program. This type of computer includes a microcontroller having a memory together with a processor, a processor requiring a separate memory, or the like. The program is stored in a ROM (Read Only Memory) mounted as hardware together with a processor. Alternatively, the program may be obtained through an electric communication line such as the Internet, or read out from a computer-readable recording medium.

In the illustrated example, the electric storage apparatus 20 and the power generation apparatus 21 share a power conditioner 23. In other words, the electric storage apparatus 20 is constituted by a storage battery 201 and the power conditioner 23, and the power conditioner 23 bidirectionally converts electric power between DC power and AC power in order to perform charging/discharging of the storage battery 201. Also the power generation apparatus 21 is constituted by a solar cell 211 and the power conditioner 23, and the power conditioner 23 converts DC power output from the solar cell 211 into AC power. The power conditioner 23 has a configuration of performing the power conversion with respect to the storage battery 201 and the solar cell 211 individually. The power conditioner 23 can also perform the operation for utilizing the power generated by the solar cell 211 for charging of the storage battery 201. The operation of the power conditioner 23 is controlled by the control device 22. The operation of the control device 22 will be described later.

The building 40 includes a distribution board 43 for receiving electric power from the power grid 30. The power conditioner 23 is connected to the electric wiring 41 via the distribution board 43. In other words, the distribution board 43 is configured to supply into the electric load 42 through the electric wiring 41 installed in the building 40: electric power received from the power grid 30; and electric power stored in the storage battery 201 or electric power generated by the solar cell 211. In FIG. 1, solid lines show electric wirings for power, and broken lines show paths for signal or information.

The control device 22 controls charging and discharging of the electric storage apparatus 20 based on main input information: electric power which the building 40 receives from the power grid 30; electric power that is output from the power conditioner 23; and electric power that is consumed by the electric load 42. The electric power that is output from the power conditioner 23 mentioned here means electric power that is output from the power generation apparatus 21. The control device 22 manages also a residual capacity of the storage battery 201 provided in the electric storage apparatus 20. Hereinafter, the electric power received from the grid power 30, the electric power that is consumed by the electric load 42, and the electric power that is generated by the power generation apparatus 21 are respectively referred to as "received power", "demand power" and "generation power". The control device 22 collects the received power, the demand power, the residual capacity and the generation power, and controls the charging and discharging of the electric storage apparatus 20 according to the control content indicated by the power management device 10.

In the illustrated example, the power management device 10 is provided in a server 50 connected with an electric communication line NT such as the Internet. The reason why the power management device 10 is provided in the server 50 is that it is convenient for collecting information from the plurality of buildings 40, and generating the control content to be supplied to the control device 22 based on the collected information. However, the centralized processing being performed by the power management device 10 in the server 50 is not essential. For example, adopted may be a configuration that all or some of functions of the power management device 10 are installed in each building 40 and the distributed processing is performed by a plurality of power management devices 10 mutually communicating.

The server 50 described below includes the power management device 10 and a communication interface 51. The communication interface 51 communicates with the control device 22 that controls charging and discharging of the electric storage apparatus 20 installed in a building 40 according to the control content indicated by the power management device 10.

The power management device 10 includes the memory 11 that stores changes in the demand power, the residual capacity and the generation power with time, with respect to each of the buildings 40. The memory 11 stores data relating to the demand power, the residual capacity, and the generation power in a time period that is equal to or more than a prescribed unit period. The data relating to the demand power, the residual capacity and the generation power is acquired by the control device 22 every prescribed period (that is selected from 1 minute, 5 minutes, 10 minutes, 30 minutes and the like, for example), and then received by the power management device 10 via the electric communication line NT.

It is desirable that the unit period be usually set to one day from 0:00 to 24:00, but may be set to two days or one week. Alternatively, one day may be divided into time periods: morning (6:00 to 12:00); daytime (12:00 to 18:00); and night (18:00 to 6:00 on the next day, for example), and each of those time periods may be set as the unit period. Alternatively, only a time slot from sunrise until sunset of one day may be set as the unit period, and in this case, because the time slot varies according to the season or a region, the unit period may also vary according to the season or the region.

The information that is stored in the memory 11 is a result value in the past or a prediction value in the future, and it is not required to report it to the power management device 10 at a time point when the information has been generated. The prediction value is calculated by adding to the result value other information (such as the date and time, the season, the region and the weather report). Therefore, the prediction value may be calculated by the server 50 instead of the control device 22.

Hereinafter, to facilitate the description, the embodiment will be described using a case example of focusing on the demand power and the generation power in four buildings 40. The residual capacity of the electric storage apparatus 20 is needed to determine the control content to be provided to the control device 22 by the power management device 10. Because the demand power, the residual capacity and the generation power are handled in the same manner on the processing of the power management device 10, the residual capacity may be subjected to the same processing as the demand power and the generation power.

Here it is assumed that demand powers and the generation powers in the four buildings 40 (40a to 40d) have been changed during the same time period, as shown in FIGS. 2A to 2D, respectively. That is, the buildings 40a, 40b, 40c and 40d respectively correspond to FIGS. 2A, 2B, 2C and 2D. In those figures, solid lines denote the demand powers, and broken lines denote the generation powers. The result as shown in FIG. 3A is obtained by overlapping the broken lines as the generation powers acquired from the four buildings 40a to 40d with one another. Also the result as shown in FIG. 4A is obtained by overlapping the solid lines as the demand powers acquired from the four buildings 40a to 40d with one another. In FIGS. 3A to 3C and 4A to 4C, reference signs 40a to 40d respectively correspond to the buildings 40a to 40d shown in FIGS. 2A to 2D. In the case example shown in FIGS. 2A to 2D, two kinds of electric power patterns: an electric power pattern (a form of a change in the generation power) shown in FIG. 3B; and an electric power pattern shown in FIG. 3C are intuitively obtained from changes in the respective generation powers of the buildings 40a to 40d. Further in the case example shown in FIGS. 2A to 2D, two kinds of electric power patterns: an electric power pattern (a form of a change in the demand power) shown in FIG. 4B; and an electric power pattern shown in FIG. 4C are intuitively obtained from changes in the respective demand powers of the buildings 40a to 40d.

The case example in FIGS. 2A to 2D is one example. If many buildings 40 are further set as targets, it is expected that the number of electric power patterns relating to the changes in the demand powers and generation powers is increased, but the increase rate of the number of the electric power patterns is less than that of the number of the buildings 40 set as targets. In a case where buildings 40 within the same region are set as targets, it is expected that when the number of the buildings 40 is increased, the number of the electric power patterns is saturated.

Here electric power patterns to changes in the demand powers, the residual capacities and the generation powers vary, depending on the scale of apparatuses (such as the electric load 42, the electric storage apparatus 20 and the power generation apparatus 21) in the building 40. In the embodiment, the demand powers, the residual capacities and the generation powers are not subjected to correction based on the scale of the apparatuses. Accordingly, the classification into the electric power patterns is performed based on only absolute values of the demand powers, the residual capacities and the generation powers.

Figure 3A:
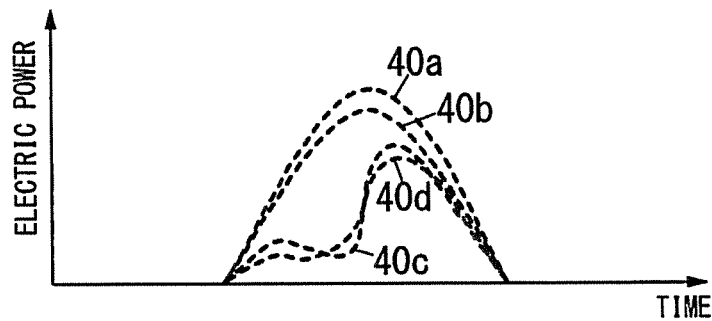
FIGS. 3A to 3C are diagrams illustrating examples where monitoring powers (generation powers) are classified in the embodiment.
Figure 3B:
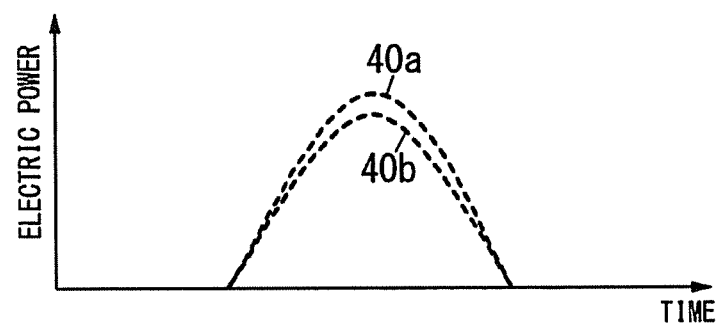
Figure 3C:
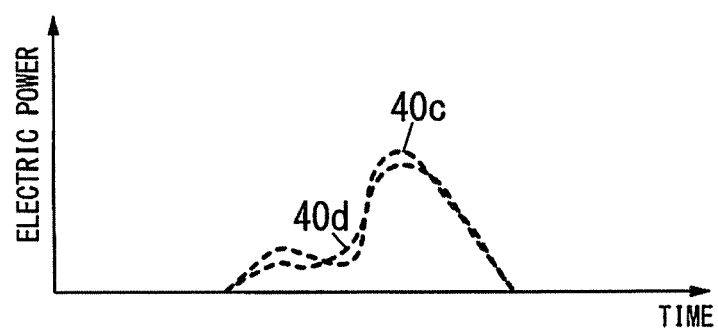
Figure 4A:
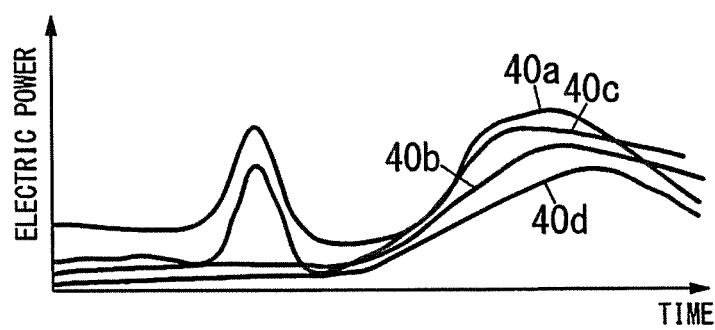
FIGS. 4A to 4C are diagrams illustrating examples where monitoring powers (demand powers) are classified in the embodiment.
Figure 4B:
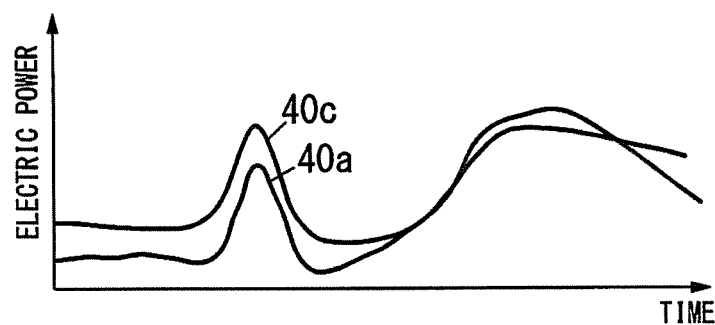
Figure 4C:
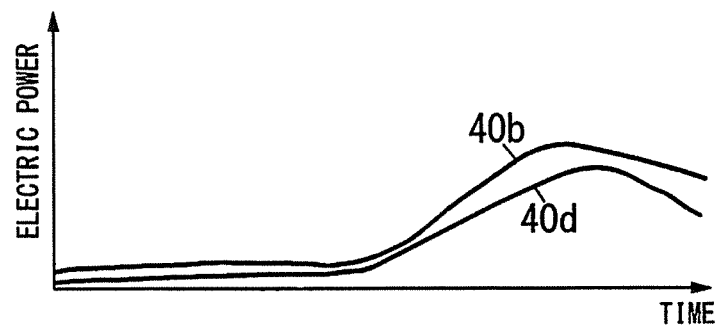

In other words, the classification portion 12 includes the cluster generator 121 that classifies the changes in the generation powers into clusters as shown in FIGS. 3B and 3C, and the changes in the demand powers into clusters as shown in FIGS. 4B and 4C. In addition, the classification portion 12 performs the classification into the electric power patterns, regarding the changes in the demand powers and the changes in the generation powers.

The cluster generator 121 classifies the changes in the demand powers and the changes in the generation powers by a clustering method such as a k-means method. Because the k-means method is to randomly generate clusters, it is preferable that the number of the clusters be previously set. If the number of the clusters is previously set, the number of combinations of the clusters to be generated is limited, and accordingly, it is possible to complete processing for classifying into the electric power patterns in a relatively short time period. Further, the calculation amount in processing for classifying into the clusters can be determined before start of the processing by the number of the clusters being previously set. As a result, it is possible to reduce occurrence of a failure such as a delay in processing. Here it is preferable to perform processing for coupling similar clusters to one cluster by regarding the set number of the clusters as an upper limit, and evaluating clusters that are generated. Note that the cluster generator 121 may classify, by other method, the changes in the demand powers and the changes in the generation powers into clusters.

Figure 5A:
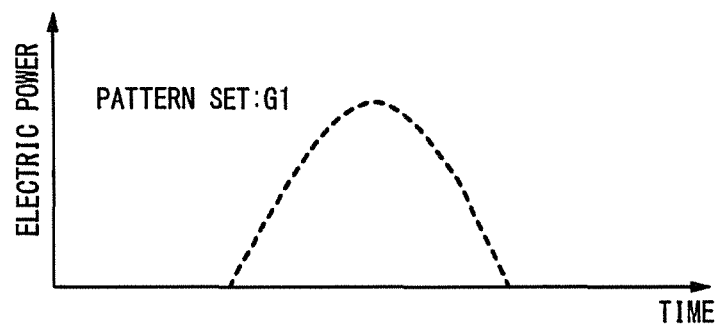
FIGS. 5A and 5B are diagrams illustrating examples of electric power patterns (generation power patterns) in the embodiment.
Figure 5B:
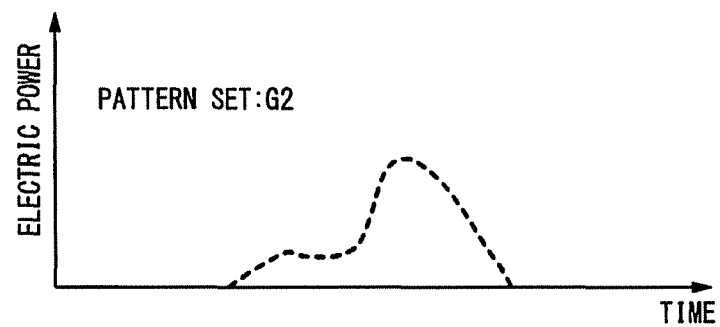
Figure 6A:
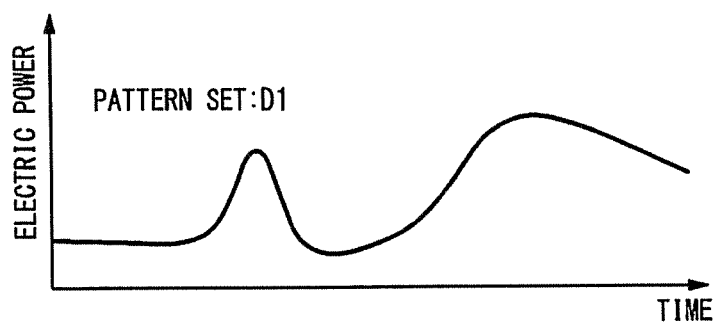
FIGS. 6A and 6B are diagrams illustrating examples of electric power patterns (demand power patterns) in the embodiment.
Figure 6B:
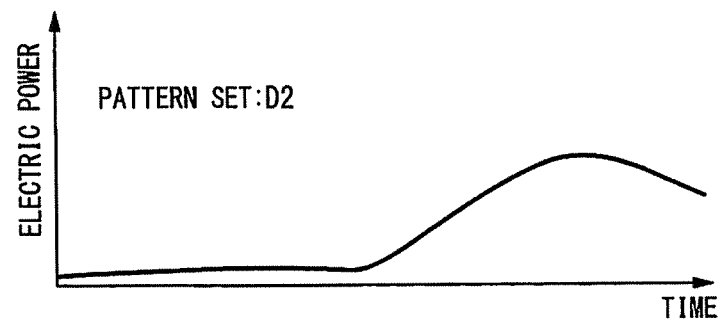
Figure 7A:
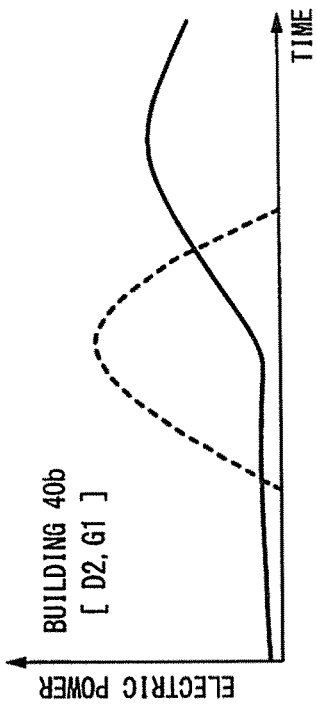
FIGS. 7A to 7D are diagrams illustrating examples where pattern sets are applied in the embodiment.
Figure 7B:
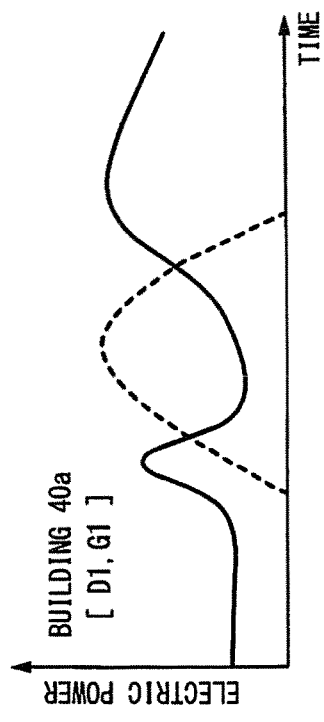
Figure 7C:
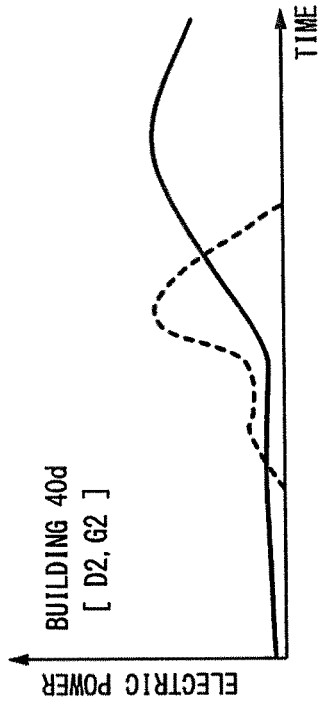
Figure 7D:
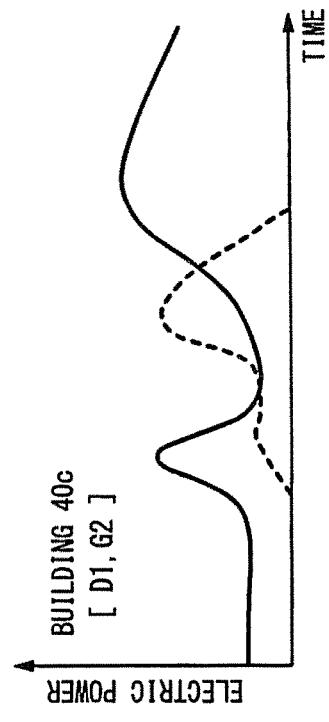

The classification portion 12 includes the pattern generator 122 that determines a representative pattern with respect to each of two or more clusters obtained by the cluster generator 121. The pattern generator 122 generates the generation power patterns (representative patterns) as shown in FIGS. 5A and 5B, based on the generation power clusters as shown in FIGS. 3B and 3C, respectively. Also, the pattern generator 122 generates the demand power patterns (representative patterns) as shown in FIGS. 6A and 6B, based on the demand power clusters as shown in FIGS. 4B and 4C, respectively. The representative pattern with respect to each cluster may be determined as an electric power pattern that has an average value of the demand power or the generation power in the cluster for each time, for example.

The classification portion 12 adds identification information to each of the demand power pattern and the generation power pattern, and then outputs it. In other words, the classification portion 12 classifies the change in the demand power and the change in the generation power into the electric power patterns, respectively. Hereinafter, the upper and lower generation power patterns shown in FIGS. 5A and 5B are referred to as G1 and G2, respectively. Also, the upper and lower demand power patterns shown in FIGS. 6A and 6B are referred to as D1 and D2, respectively. The demand power patterns and the generation power patterns are provided to the planning portion 13. The planning portion 13 determines control content for charging and discharging of the electric storage apparatus 20 in each building 40, with respect to each pattern set, obtained by combination of a demand power pattern and a generation power pattern.

That is, the planning portion 13 includes the pattern determiner 131 that applies a demand power pattern and a generation power pattern to each building 40, in order to determine the control content for charging and discharging of the electric storage apparatus 20 in each building 40. The pattern determiner 131 compares and evaluates two or more demand power patterns (representative patterns), which respectively corresponds to two or more clusters determined by the pattern generator 122, with a change in demand power of a building 40 to be noted, stored in the memory 11, and then applies a demand power pattern having the highest similarity to the building 40 to be noted. Also, the pattern determiner 131 compares and evaluates two or more generation power patterns (representative patterns), which respectively corresponds to two or more clusters determined by the pattern generator 122, with a change in generation power of the building 40 to be noted, stored in the memory 11, and then applies a generation power pattern having the highest similarity to the building 40 to be noted. In other words, a demand power pattern and a generation power pattern are applied to each building 40, individually.

Figure 2A:
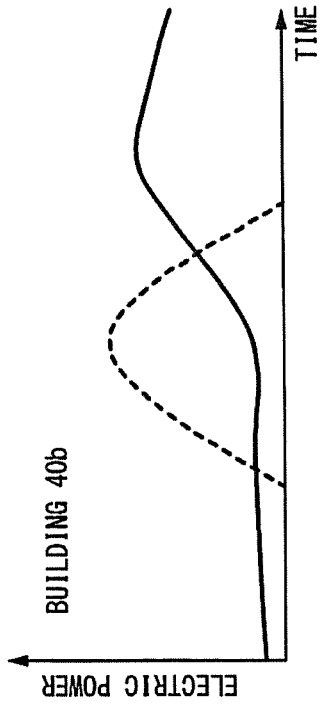
FIGS. 2A to 2D are diagrams illustrating examples of changes in monitoring powers in the embodiment.
Figure 2B:
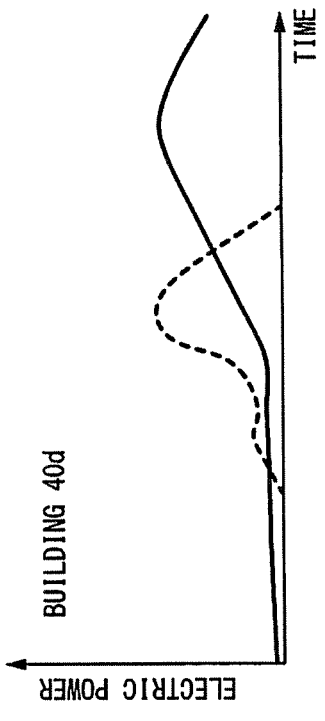
Figure 2C:
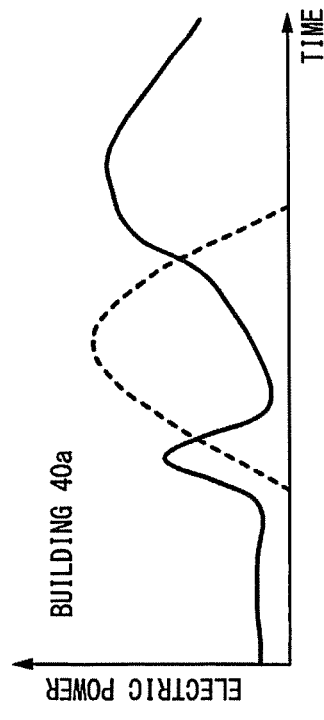
Figure 2D:
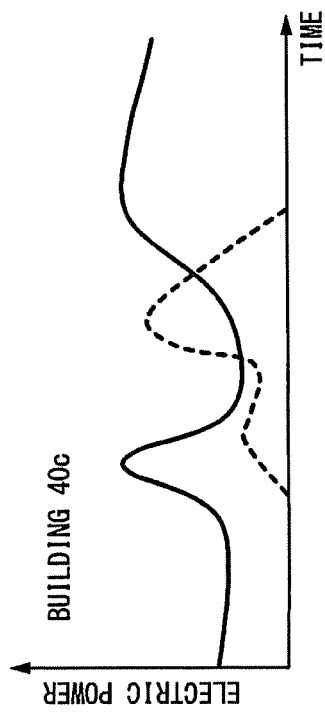

Regarding the examples of FIGS. 2A to 2D, a demand power pattern of the building 40a in FIG. 2A corresponds to D1, and a generation power pattern thereof corresponds to G1. Thus, if the building 40a is represented by [D1, G1], the buildings 40b, 40c and 40d in FIGS. 2B, 2C and 2D can be also respectively represented by [D2, G1], [D1, G2] and [D2, G2]. Therefore, combinations of the demand and generation power patterns of the buildings 40a to 40d are shown as FIGS. 7A to 7D, respectively.

Regarding a building 40 of which change in demand power and change in generation power are used for extracting the electric power patterns, any of the extracted electric power patterns is applied to the building 40. On the other hand, when a building 40 not used for extracting the electric power patterns is present, the pattern determiner 131 evaluates similarity between a change in demand power extracted from the building 40 and each of the determined demand power patterns, and then applies a demand power pattern having the highest similarity to the building 40. Also the pattern determiner 131 evaluates similarity between a change in generation power extracted from the building 40 and each of the determined generation power patterns, and then applies a generation power pattern having the highest similarity to the building 40. The pattern determiner 131 evaluates the similarity, using an evaluation value such as a Euclidean distance, and, if the evaluation value is deviated from an allowable range, generates a new electric power pattern without applying any of the existing electric power patterns to the building 40.

The planning portion 13 calculates a demand power pattern and a generation power pattern for each building 40, individually, and then generates control content relating to charging and discharging of an electric storage apparatus 20 in the each building under a predetermined condition. The condition for generating the control content is to minimize any one of an amount of electric power to be received from the power grid 30, a compensation of the amount of electric power to be received from the power grid 30, and an amount of carbon dioxide to be exhausted. This condition is applied to all buildings 40 in common. However, different conditions may be applied to buildings 40, depending on requests of the buildings 40, The condition is set to maximize or minimize the benefit. Accordingly, the planning portion 13 can determine the control content with good accuracy by handling it as, for example, a mixed integer programming problem, when generating the control content under restriction of the condition.

The planning portion 13 generates the control content for each combination of a demand power pattern and a generation power pattern. In the above-mentioned example, four kinds of combinations are obtained with respect to the four buildings 40a to 40d, and the number of buildings 40 is equal to the total number of pattern sets. However, it can be easily guessed that the number of buildings 40 is not proportion to the total number of pattern sets, and as the number of buildings 40 is more increased, kinds (the total number) of pattern sets are gradually saturated.

For example, even when the number of buildings 40 is 500, the number of kinds of demand power patterns may be consolidated into only five, and also the number of kinds of generation power patterns may be consolidated into only five. In this example, the number of combinations of electric power patterns is 25 with respect to 500 buildings 40. Accordingly, at most 25 kinds of control contents may be generated for the 500 buildings 40, and therefore, the processing load for generating the control contents can be reduced more significantly, compared with a case where control content is generated for combination of a change in demand power and a change in generation power of each building.

In addition, even if the condition for determining the control contents can be selected from three kinds of conditions, at most 75 kinds of control contents may be generated. Also in this case, the processing load can be more reduced, compared with the case where control content is generated for each of the 500 buildings 40. Even when the number of buildings 40 is 10000, the number of kinds of pattern sets is not increased significantly, and accordingly the processing load is not increased to 20 times as large as that in the case where the number of buildings 40 is 500. Therefore, it can be estimated that the processing load is increased to only 4 to 5 times.

Table 1 shows an example where demand power patterns, generation power patterns and residual capacity patterns are assigned to buildings 40 (No. 1 to No. N), the number of which is N. In the example of Table 1, three kinds of demand power patterns (D1 to D3), five kinds of generation power patterns (G1 to G5) and three kinds of residual capacity patterns (R1 to R3) are assumed.

TABLE 1

| Building | Demand Power Pattern | Generation Power Pattern | Residual Capacity Pattern |
| --- | --- | --- | --- |
| No. 1 | D1 | G5 | R1 |
| No. 2 | D2 | G3 | R1 |
| No. 3 | D1 | G4 | R1 |
| No. 4 | D2 | G5 | R2 |
| No. 5 | D3 | G2 | R3 |
| No. 6 | D3 | G1 | R1 |
| No. 7 | D2 | G1 | R3 |
| . | . | . | . |
| . | . | . | . |
| . | . | . | . |
| No. N | D2 | G3 | R2 |

The control contents respectively corresponding to the patterns sets, determined by the planning portion 13, are input to the indication portion 14. The indication portion 14 informs the control device 22 of a building 40, which each pattern set conforms with, of control content via a communication interface 51 (hereinafter, referred to as the "communication I/F"). That is, the indication portion 14 informs the control device 22 of the control content via the electric communication line NT. Generally, a communication apparatus installed in a building 40 does not allow access from an external device via the electric communication line NT. Therefore, it is preferable that the control device 22 access the server 50 when powered on or at an appropriate timing to receive the control content.

When receiving the control content, the control device 22 collects the received power, the demand power, the residual capacity and the generation power, and controls the charging and discharging of the electric storage apparatus 20 based on the control content provided from the indication portion 14, as described above. The above-mentioned operation is repeated at fixed time intervals, or appropriate timings, and the charging and discharging of the electric storage apparatus 20 is controlled according to the control content that is determined based on a pattern set where a demand power pattern and a generation power pattern (and a residual capacity pattern) are combined, which corresponds to each building 40.

Note that, regarding the residual capacity, not a form of a change in electric power with time, but a value of the residual capacity at a starting point of the unit period is used for the residual capacity pattern, unlike the demand power pattern or the generation power pattern. Accordingly, for example, the value is classified into any one of three kinds of residual capacity patterns (the residual capacities of 0%, 50% and 100%), any one of six kinds of residual capacity patterns in units of 20%, or any one of eleven kinds of residual capacity patterns in units of 10%.

As described above, since a change in demand power, a change in residual capacity and a change in generation power of each buildings 40 are classified into electric power patterns, and control content corresponding to each buildings 40 is determined based on a pattern set in which the electric power patterns are combined, the processing load for determining the control contents can be reduced. In other words, the processing load on the server 50 in which the power management device 10 is installed can be reduced, and the cost required for management of the server 50 can be reduced. In addition, since the processing load for determining the control contents can be reduced, it is possible to update the control contents at shorter time intervals, and correct control content before the effect of an error in the control content due to a prediction error is increased. As a result, the charging and discharging of the electric storage apparatus 20 in each building 40 can be controlled with good accuracy, and the condition (purpose) that has been set upon determining the control content can be easily achieved.

In the above configuration example, when the cluster generator 121 classifies changes in demand powers into two or more clusters, and changes in generation powers into two or more clusters (and the residual capacities into two or more clusters), the cluster generator 121 focuses on only electric power. Here, when the power generation apparatus 21 is a solar power generation apparatus with the solar cell 211, the generation power changes, depending on a weather condition such as an amount of solar radiation or an atmospheric temperature. In addition, the weather condition is affected by a region where the solar cell 211 is located. Therefore, when the solar power generation apparatus is used, it is preferable to additionally consider information relating to the result value of the generation power by the solar power generation apparatus and a region where a building 40 is located. When the region information is used for an initial condition upon the classification into two or more clusters, it is possible to reduce the number of elements in a case of classifying changes in a plurality of generation powers respectively corresponding to a plurality of buildings 40 into two or more clusters, and as a result, easily converge the two or more clusters.

Furthermore, when information regarding the rated capacities of solar cells 211 is used for the initial condition in a case of classifying changes in a plurality of generation powers (result values or prediction values) respectively corresponding to a plurality of solar power generation apparatuses in the plurality of buildings 40 into two or more clusters, it is possible to reduce the number of elements upon the classification of the plurality of generation powers into the two or more clusters, and as a result, easily converge the two or more clusters. Also in a case of classifying residual capacities of electric storage apparatuses 20 into two or more clusters, information regarding the maximum capacities of the electric storage apparatuses 20 may be used for the initial condition.

Although in the above-mentioned configuration example the electric storage apparatus 20 is constituted by the storage battery 201 and the power conditioner 23, a storage battery for traveling, installed in an electric drive vehicle, may be used instead of the storage battery 201 installed in a building 40. The electric drive vehicle may be an electric vehicle, a plug-in hybrid electric vehicle, an electric two wheeler or the like. When the storage battery of the electric drive vehicle is used as the electric storage apparatus 20, a power conversion apparatus that performs charging and discharging of the storage battery may be used instead of the power conditioner 23. It is estimated that although a change in the residual capacity of the storage battery installed in the electric drive vehicle depends on the way of using the electric drive vehicle, electric power can be classified for each building 40. Therefore, the above-mentioned technique can be applied.

When the electric drive vehicle is an electric vehicle or an electric two wheeler, the residual capacity of the storage battery can be handled, similarly to the storage battery 201 of the electric storage apparatus 20 described above. In this case, a prediction value of the residual capacity is predicted based on a traveling schedule of the electric drive vehicle. However, when the electric drive vehicle is a plug-in hybrid electric vehicle, it is impossible to predict an amount of electric power that can be discharged from it, based on the residual capacity of the storage battery installed in the electric drive vehicle. Accordingly it is preferable to acquire information regarding a travelable distance from the electric drive vehicle, and convert, to an amount of electric power that can be discharged, a distance obtained by subtracting a traveling schedule distance of the electric drive vehicle from the travelable distance. When the electric drive vehicle is a fuel cell vehicle, it does not contribute to charging, but the above-mentioned technique may be applied considering only discharging.

Although the present invention has been described with reference to certain preferred embodiments, numerous modifications and variations can be made by those skilled in the art without departing from the true spirit and scope of this invention, namely claims.

The invention claimed is:

1. A power management system configured to indicate control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid, the power management system comprising:
 a memory configured to store data relating to a change in monitoring power with time with respect to each of the buildings, the monitoring power being electric power to be noted in each of the buildings;
 a classification portion configured to classify data relating to a change in the monitoring power during a prescribed unit period with respect to each of the buildings, stored in the memory, into any one of kinds of electric power patterns data;
 a planning portion configured to apply two or more pattern data models based on the kinds of electric power patterns data to a building, and determine the control content for charging and discharging of the electric storage apparatus of the building with respect to each applied pattern data model under a condition of minimizing any one of an amount of electric power to be received from the power grid, a compensation of the amount of electric power to be received from the power grid, and an amount of carbon dioxide to be exhausted;
 an indication portion configured to indicate the control content corresponding to each of the two or more pattern data models applied by the planning portion to the electric storage apparatus of the building, which each pattern data model conforms with, of the buildings; and
 a control device configured to control charging and discharging of at least one of the electric storage apparatuses according to the control content based on plural buildings,
wherein:
 the monitoring power includes demand power that is electric power consumed by the electric load in each building and a residual capacity of the electric storage apparatus in each building;
 the memory is configured to store data relating to a change in the demand power with time and data relating to a change in the residual capacity with time with respect to each building;
 the kinds of electric power patterns data includes two or more kinds of demand power patterns data, any one of which the change in the demand power during the prescribed unit period is classified into, and two or more kinds of residual capacity patterns data, any one of which the residual capacity at a starting point of the prescribed unit period is classified into;

the classification portion is configured to classify each of demand powers respectively corresponding to the buildings, stored in the memory, into any one of the two or more kinds of demand power patterns data, and classify each of residual capacities respectively corresponding to the buildings, stored in the memory, into any one of the two or more kinds of residual capacity patterns data; and each of the two or more pattern data models includes a combination of any one of the two or more kinds of demand power patterns data and any one of the two or more kinds of residual capacity patterns data.

2. The power management system according to claim 1, wherein:

when a power generation apparatus that generates power with natural energy and supplies the power generated to the electric load through the electric wiring is installed in each of the buildings, the monitoring power further includes generation power that is electric power generated by the power generation apparatus in each building;

the memory is configured to store data relating to a change in the generation power with time with respect to each building;

the kinds of electric power patterns data further includes two or more kinds of generation power patterns data, any one of which the change in the generation power during the prescribed unit period is classified into;

the classification portion is configured to classify each of generation powers respectively corresponding to the buildings, stored in the memory, into any one of the two or more kinds of generation power patterns data; and each of the two or more pattern data models includes a combination of any one of the two or more kinds of demand power patterns data, any one of the two or more kinds of residual capacity patterns data, and any one of the two or more kinds of generation power patterns data.

3. The power management system according to claim 2, wherein the classification portion is configured to classify the generation powers into the two or more kinds of generation power patterns data, based on a region where the power generation apparatus is located, in addition to the change in the generation power.

4. The power management system according to claim 2, wherein the classification portion is configured to classify the generation powers into the two or more kinds of generation power patterns data, based on rated power of the power generation apparatus, in addition to the change in the generation power.

5. The power management system according to claim 1, wherein the classification portion includes:
a cluster generator configured to classify changes in monitoring powers respectively corresponding to the buildings during the prescribed unit period into two or more clusters; and
a pattern generator configured to determine a representative pattern data for changes in one or more monitoring powers with respect to each of the two or more clusters obtained by the cluster generator, and the planning portion includes a pattern determiner that is configured to compare: two or more representative patterns data respectively corresponding to the two or more clusters, determined by the pattern generator; and a change in monitoring power with respect to a building to be noted, stored in the memory, the pattern determiner being configured to set a representative pattern data having the highest similarity, among the two or more representative patterns data, to an electric power pattern data for the building to be noted.

6. The power management system according to claim 5, wherein the cluster generator previously stores a number of the two or more clusters for classifying the changes in the monitoring powers.

7. The power management system according to claim 1, wherein the monitoring power stored in the memory is at least one of: a result value during a past unit period; and a prediction value during a future unit period.

8. A power management system, configured to indicate control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid, the power management system comprising:
a memory configured to store data relating to a change in monitoring power with time with respect to each of the buildings, the monitoring power being electric power to be noted in each of the buildings;
a classification portion configured to classify data relating to a change in the monitoring power during a prescribed unit period with respect to each of the buildings, stored in the memory, into any one of kinds of electric power patterns data;
a planning portion configured to apply two or more pattern data models based on the kinds of electric power patterns data to a building, and determine the control content for charging and discharging of the electric storage apparatus of the building with respect to each applied pattern data model under a condition of minimizing any one of an amount of electric power to be received from the power grid, a compensation of the amount of electric power to be received from the power grid, and an amount of carbon dioxide to be exhausted;
an indication portion configured to indicate the control content corresponding to each of the two or more pattern data models applied by the planning portion to the electric storage apparatus of the building, which each pattern data model conforms with, of the buildings;
the electric storage apparatus installed in each of the buildings of the consumers which receive electric power from the power grid, the electric storage apparatus being configured to supply power together with electric power received from the power grid into the electric load through the electric wiring installed in each of the buildings; and
a control device configured to control charging and discharging at least one of the electric storage apparatuses according to the control content based on plural buildings, wherein:
the monitoring power includes demand power that is electric power consumed by the electric load in each building and a residual capacity of the electric storage apparatus in each building;

the memory is configured to store data relating to a change in the demand power with time and data relating to a change in the residual capacity with time with respect to each building;

the kinds of electric power patterns data includes two or more kinds of demand power patterns data, any one of which the change in the demand power during the prescribed unit period is classified into, and two or more kinds of residual capacity patterns data, any one of which the residual capacity at a starting point of the prescribed unit period is classified into;

the classification portion is configured to classify each of demand powers respectively corresponding to the buildings, stored in the memory, into any one of the two or more kinds of demand power patterns data, and classify each of residual capacities respectively corresponding to the buildings, stored in the memory, into any one of the two or more kinds of residual capacity patterns data; and each of the two or more pattern data models includes a combination of any one of the two or more kinds of demand power patterns data and any one of the two or more kinds of residual capacity patterns data.

9. A power management method of indicating control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid, the power management method comprising:
   storing, with a memory, data relating to a change in monitoring power with time with respect to each of the buildings, the monitoring power being electric power to be noted in each of the buildings;
   classifying, with a classification portion, data relating to a change in the monitoring power during a prescribed unit period with respect to each of the buildings, stored in the memory, into any one of kinds of electric power patterns data;
   applying, with a planning portion, two or more pattern data models based on the kinds of electric power patterns data to a building, and determining the control content for charging and discharging of the electric storage apparatus of the building with respect to each applied pattern data model under a condition of minimizing any one of an amount of electric power to be received from the power grid, a compensation of the amount of electric power to be received from the power grid, and an amount of carbon dioxide to be exhausted;
   indicating, with an indication portion, the control content corresponding to each of the two or more pattern data models applied by the planning portion to the electric storage apparatus of the building, which each pattern data model conforms with, of the buildings; and
   controlling charging and discharging of at least one of the electric storage apparatuses according to the control content based on plural buildings;

wherein:
the monitoring power includes demand power that is electric power consumed by the electric load in each building and a residual capacity of the electric storage apparatus in each building;

the power management method further comprises storing, with the memory, data relating to a change in the demand power with time and data relating to a change in the residual capacity with time with respect to each building;

the kinds of electric power patterns data includes two or more kinds of demand power patterns data, any one of which the change in the demand power during the prescribed unit period is classified into, and two or more kinds of residual capacity patterns data, any one of which the residual capacity at a starting point of the prescribed unit period is classified into;

the power management method further comprises
   classifying, with the classification portion, each of demand powers respectively corresponding to the buildings, stored in the memory, into any one of the two or more kinds of demand power patterns data,
   classifying, with the classification portion, each of residual capacities respectively corresponding to the buildings, stored in the memory, into any one of the two or more kinds of residual capacity patterns data; and each of the two or more pattern data models includes a combination of any one of the two or more kinds of demand power patterns data and any one of the two or more kinds of residual capacity patterns.

10. A non-transitory computer-readable medium having stored thereon a computer program which, upon execution by a computing system, causes the computing system to perform a method comprising:
   indicating control content for charging and discharging of an electric storage apparatus installed in each of buildings of consumers to each of the buildings individually, when supplying into an electric load through an electric wiring installed in each of the buildings: electric power stored in the electric storage apparatus in each of the buildings which receive electric power from a power grid; and electric power received from the power grid,
   storing data relating to a change in monitoring power with time with respect to each of the buildings, the monitoring power being electric power to be noted in each of the buildings;
   classifying data relating to a change in the monitoring power during a prescribed unit period with respect to each of the buildings, stored, into any one of kinds of electric power patterns data;
   applying two or more pattern data models based on the kinds of electric power patterns data to a building, and determining the control content for charging and discharging of the electric storage apparatus of the building with respect to each applied pattern data model under a condition of minimizing any one of an amount of electric power to be received from the power grid, a compensation of the amount of electric power to be received from the power grid, and an amount of carbon dioxide to be exhausted;
   indicating the control content corresponding to each of the two or more pattern data models applied to the electric storage apparatus of the building, which each pattern data model conforms with, of the buildings; and
   controlling charging and discharging of at least one of the electric storage apparatuses according to the control content based on plural buildings;

wherein:
the monitoring power includes demand power that is electric power consumed by the electric load in each building and a residual capacity of the electric storage apparatus in each building;

the power management method further comprises storing, with the memory, data relating to a change in the demand power with time and data relating to a change in the residual capacity with time with respect to each building;

the kinds of electric power patterns data includes two or more kinds of demand power patterns data, any one of which the change in the demand power during the prescribed unit period is classified into, and two or more kinds of residual capacity patterns data, any one of which the residual capacity at a starting point of the prescribed unit period is classified into;

the power management method further comprises
classifying, with the classification portion, each of demand powers respectively corresponding to the buildings, stored in the memory, into any one of the two or more kinds of demand power patterns data,
classifying, with the classification portion, each of residual capacities respectively corresponding to the buildings, stored in the memory, into any one of the two or more kinds of residual capacity patterns data; and each of the two or more pattern data models includes a combination of any one of the two or more kinds of demand power patterns data and any one of the two or more kinds of residual capacity patterns data.

* * * * *